United States Patent
Liu et al.

(10) Patent No.: US 12,297,394 B2
(45) Date of Patent: May 13, 2025

(54) METHOD FOR PRODUCING HYDROGEN FROM WOODY WASTE THROUGH STAGED PYROLYSIS AND CATALYTIC GASIFICATION

(71) Applicant: Changzhou University, Changzhou (CN)

(72) Inventors: Peng Liu, Changzhou (CN); Tingzhou Lei, Changzhou (CN); Yanling Li, Changzhou (CN); Tanglei Sun, Changzhou (CN); Yantao Yang, Changzhou (CN); Suxia Ren, Changzhou (CN); Lili Dong, Changzhou (CN); Taoli Huhe, Changzhou (CN)

( * ) Notice: Subject to any disclaimer, the term of this patent is extended or adjusted under 35 U.S.C. 154(b) by 0 days.

(21) Appl. No.: 18/940,189

(22) Filed: Nov. 7, 2024

(65) Prior Publication Data

US 2025/0059455 A1    Feb. 20, 2025

Related U.S. Application Data

(63) Continuation of application No. PCT/CN2023/092288, filed on May 5, 2023.

(30) Foreign Application Priority Data

May 20, 2022 (CN) .......................... 202210553140.6

(51) Int. Cl.
| | | |
|---|---|---|
| C10J 3/64 | (2006.01) | |
| B01J 21/18 | (2006.01) | |
| B01J 35/61 | (2024.01) | |
| B01J 35/64 | (2024.01) | |
| C01B 3/02 | (2006.01) | |

(52) U.S. Cl.
CPC .................. *C10J 3/64* (2013.01); *B01J 21/18* (2013.01); *B01J 35/613* (2024.01); *B01J 35/615* (2024.01); *B01J 35/647* (2024.01); *C01B 3/02* (2013.01); *C10J 2300/092* (2013.01); *C10J 2300/0969* (2013.01); *C10J 2300/0976* (2013.01)

(58) Field of Classification Search
CPC ...... B01J 35/647; B01J 35/615; B01J 35/613; B01J 21/18; C01B 3/02
See application file for complete search history.

(56) References Cited

U.S. PATENT DOCUMENTS

| 8,383,871 B1 | 2/2013 | Sellars et al. |
| 2022/0081629 A1 | 3/2022 | Do et al. |

FOREIGN PATENT DOCUMENTS

| CN | 110976487 A | 4/2020 |
| CN | 114149816 A | 3/2022 |
| CN | 115044396 A | 9/2022 |

OTHER PUBLICATIONS

Wang et al., ACS Sustainable Chem. & Eng., (2020), v.8, p. 13377-13386.*
Lu Pengmei et al., An experimental study on hydrogen-rich gas production from biomass residue catalytic pyrolysis, Techniques and Equipment for Environmental Pollution Control, Sep. 26, 2006, pp. 37-42, vol. 7, No. 9, China.

* cited by examiner

Primary Examiner — Yong L Chu

(57) ABSTRACT

Disclosed in the present disclosure is a method for producing hydrogen from woody waste through staged pyrolysis and catalytic gasification. The method includes: performing baking pretreatment on the woody waste; thermally activating aluminum smelting waste residues, and mixing the thermally activated aluminum smelting waste residues with the baked woody waste; pyrolyzing and gasifying the mixture for hydrogen production to obtain primary pyrolysis gas and a carbon-aluminum composite material; and further catalytically cracking the obtained primary pyrolysis gas by taking the obtained carbon-aluminum composite material as a catalyst. In the present disclosure, staged thermochemical conversion including low-temperature thermal treatment, medium-temperature catalytic gasification and tar steam reforming are performed on the woody waste, the cheap aluminum smelting waste residues are used as the catalyst, and tar steam is catalyzed by pyrolysis residues, such that a tar yield in a pyrolysis process is reduced, and a hydrogen yield is improved.

3 Claims, No Drawings

METHOD FOR PRODUCING HYDROGEN FROM WOODY WASTE THROUGH STAGED PYROLYSIS AND CATALYTIC GASIFICATION

CROSS-REFERENCE TO RELATED APPLICATIONS

The present application is a continuation of International Application No. PCT/CN2023/092288, filed on May 5, 2023, which claims priority to Chinese Patent Application No. 2022105531406, filed on May 20, 2022, the entire disclosure of which is incorporated herein by reference.

TECHNICAL FIELD

The present disclosure belongs to the technical field of solid waste disposal and energy utilization, and particularly relates to a method for producing hydrogen from woody waste through staged pyrolysis and catalytic gasification.

BACKGROUND

Biomass has the characteristics of low sulfur, low nitrogen, high volatile matter, high ash coke activity, zero $CO_2$ emission, etc., and biomass energy will play an important role in the implementation of carbon peaking and carbon neutrality goals. Moreover, hydrogen is clean and low-carbon secondary energy. Hydrogen production through biomass gasification can reduce fossil energy utilization from hydrogen production sources and reduce $CO_2$ emission, and achieve zero carbon emission in an energy utilization process. However, the biomass has the defects of a low hydrogen content, a high oxygen content, a strong water absorption property, a low density, etc. In the process of utilization, a hydrogen yield is low, a transportation cost and a utilization scale are contradictory, and the biomass is not easy to crush, which causes certain problems in the process of hydrogen production from the biomass. It is necessary to take certain pretreatment measures to improve a biomass structure, regulate a gasification process, further increase hydrogen conversion in tail gas purification, and improve a hydrogen conversion rate of the biomass.

A general treatment method for aluminum smelting waste residues is direct landfill, but the aluminum smelting waste residues contain heavy metals and other polluting components, and have certain alkalinity, and therefore, often cause secondary pollution to soil after burial.

SUMMARY

An objective of this section is to summarize some aspects of examples of the present disclosure, and briefly introduce some preferred examples. Simplifications or omissions may be made in this section, as well as in the abstract and invention title of the present disclosure, to avoid obscuring the objective of this section, the abstract and the invention title, and such simplifications or omissions should not be used for limiting the scope of the present disclosure.

In view of the above problems and/or problems existing in the prior art, the present disclosure is provided.

One of the objectives of the present disclosure is to provide a method for producing hydrogen from woody waste through staged pyrolysis and catalytic gasification. In the present disclosure, staged thermochemical conversion including low-temperature thermal treatment, medium-temperature catalytic gasification and tar steam reforming are performed on the woody waste, cheap aluminum smelting waste residues are used as a catalyst, and tar steam is catalyzed by pyrolysis residues, such that a tar yield in a pyrolysis process is reduced, and a hydrogen yield is improved.

In order to solve the above technical problems, the present disclosure provides the technical solutions as follows: a method for producing hydrogen from woody waste through staged pyrolysis and catalytic gasification includes:
performing baking pretreatment on the woody waste;
thermally activating aluminum smelting waste residues, and mixing the thermally activated aluminum smelting waste residues with the baked woody waste;
pyrolyzing and gasifying the mixture for hydrogen production to obtain primary pyrolysis gas and a carbon-aluminum composite material; and
further catalytically cracking the obtained primary pyrolysis gas by taking the obtained carbon-aluminum composite material as a catalyst.

As a preferred solution of the method for producing hydrogen from woody waste through staged pyrolysis and catalytic gasification of the present disclosure, the performing baking pretreatment on the woody waste is performed at a baking temperature of 200-300° C. for baking time of 20-60 min.

As a preferred solution of the method for producing hydrogen from woody waste through staged pyrolysis and catalytic gasification of the present disclosure, the thermally activating aluminum smelting waste residues includes: mixing the aluminum smelting waste residues with 5% organic acid by volume, placing a mixture in a high-pressure reaction kettle, adding deionized water for a reaction, performing cooling, and then, performing dehydrating and calcining.

As a preferred solution of the method for producing hydrogen from woody waste through staged pyrolysis and catalytic gasification of the present disclosure, a mass volume ratio of the aluminum smelting waste residues to the organic acid is 1:1.

The organic acid includes one or more of acetic acid, benzoic acid and phenol.

As a preferred solution of the method for producing hydrogen from woody waste through staged pyrolysis and catalytic gasification of the present disclosure, the deionized water is added for the reaction, and a mass ratio of the water to the aluminum smelting waste residues is 2-4:1.

A temperature for the reaction is 200-300° C., and reaction time is 30-45 min.

As a preferred solution of the method for producing hydrogen from woody waste through staged pyrolysis and catalytic gasification of the present disclosure, the calcining is performed at a calcining temperature of 500-600° C. for calcining time of 1-2 h.

As a preferred solution of the method for producing hydrogen from woody waste through staged pyrolysis and catalytic gasification of the present disclosure, the mixing the thermally activated aluminum smelting waste residues with the baked woody waste is performed according to a mass ratio of 1:1 at 200-300° C.

As a preferred solution of the method for producing hydrogen from woody waste through staged pyrolysis and catalytic gasification of the present disclosure, the pyrolyzing and gasifying the mixture for hydrogen production includes performing a pyrolysis reaction on the mixture at a temperature of 500-700° C. for 15-60 min.

As a preferred solution of the method for producing hydrogen from woody waste through staged pyrolysis and catalytic gasification of the present disclosure, the pyrolysis reaction is performed under a $CO_2/H_2O$ atmosphere, and a total flow rate of the introduced $CO_2/H_2O$ atmosphere is 0.1-0.2 L/min.

A volume ratio of $CO_2/H_2O$ is 1-4:1.

As a preferred solution of the method for producing hydrogen from woody waste through staged pyrolysis and catalytic gasification of the present disclosure, the further catalytically cracking the obtained primary pyrolysis gas is performed at a temperature of 700-900° C.

Compared to the prior art, the present disclosure has the beneficial effects as follows:

In the present disclosure, staged thermochemical conversion including low-temperature thermal treatment, medium-temperature catalytic gasification and tar steam reforming are performed on the woody waste, the cheap aluminum smelting waste residues are used as the catalyst, and tar steam is catalyzed by pyrolysis residues, such that a tar yield in a pyrolysis process is reduced, and a hydrogen yield is improved. Polluting components in the aluminum smelting waste residues are fixed in the pyrolysis process, such that alkalinity is reduced. An aromatic hydrocarbon polymerization degree in the carbon-aluminum composite material is improved in the carbon-aluminum composite material forming process, such that the physical and chemical microstructure of the carbon-aluminum composite material is improved, catalytic tar reforming for hydrogen production through the low-cost carbon-aluminum composite material is improved, and energy conversion and reduction of the woody waste, and the harmless and recycling utilization of the aluminum smelting waste residues are realized.

DETAILED DESCRIPTION OF THE EMBODIMENTS

To enable the objectives, features, and advantages mentioned above of the present disclosure to be more apparent and easily understood, particular examples of the present disclosure will be described in detail below in combination with the examples of the description.

Many specific details are set forth in the following description to facilitate full understanding of the present disclosure, but the present disclosure may also be implemented in other ways different from those described herein, similar derivatives may be made by those skilled in the art without departing from the connotation of the present disclosure, and therefore, the present disclosure is not limited by the particular examples disclosed below.

Secondly, "one example" or "an example" referred herein means that a particular feature, structure, or characteristic may be included in at least one implementation mode of the present disclosure. Appearances of "in one example" in various places throughout this description are not all referring to the same example, nor the separate or alternative examples mutually exclusive of other examples.

Unless otherwise specified, the raw materials used in the examples are commercially available.

Example 1

(1) Baking pretreatment: pine sawdust with a moisture content lower than 10% was crushed to below 3 mm, and was baked in a low-temperature baking furnace at 250° C. for 60 min.
(2) Mixing between baked biomass and aluminum smelting waste residues: 40 g of aluminum smelting waste residues were mixed with 5% organic acid of acetic acid by equal volume, stirred uniformly, and placed into a high-pressure reaction kettle. Deionized water was added, where a mass ratio of the water to the aluminum smelting waste residues was 3:1. A reaction was performed at 200° C. for 30 min, cooling was performed, and the sample was taken out, then was dehydrated and calcined at 550° C. for 2 h in a muffle furnace, and thermally activated. Due to good fluidity of the aluminum smelting waste residues, the aluminum smelting waste residues were mixed with the baked biomass well in a premixing reactor at 250° C. according to a mass ratio of 1:1, forming a plug flow moving bed layer, which was brought into a reaction furnace.
(3) Catalytic gasification of baked biomass by aluminum smelting waste residues: the mixture of the aluminum smelting waste residues and pine sawdust obtained in step (2) was heated to 700° C. in a pyrolysis furnace, a $CO_2/H_2O$ atmosphere with a volume ratio of 4/1 and a total flow rate of 0.2 L/min was introduced, and a pyrolysis reaction was performed for 30 min. Woody waste was catalyzed by the aluminum smelting waste residues for steam gasification to generate hydrogen of 384 ml/g, methane of 27 ml/g, carbon dioxide of 126 ml/g and carbon monoxide of 165 ml/g. At the same time, a liquid product was obtained with a yield of 23%. A carbon-aluminum composite material was obtained with a yield of 18%, a specific surface area of the carbon-aluminum composite material was 70-100 $m^2/g$, and an average pore size was 10-15 nm.
(4) Catalytic reforming of pyrolysis gas: the carbon-aluminum composite material obtained through the pyrolysis reaction of the step (3) was activated by steam and used as a fluidized bed catalyst in a second stage pyrolysis furnace. The primary pyrolysis gas (containing tar and pyrolysis gas) obtained in step (3) entered the second stage pyrolysis furnace for further catalytic cracking and reforming. Catalytic conversion was performed at 900° C., the carbon-aluminum composite material catalyzed the tar for cracking and reforming to obtain hydrogen of 679 ml/g, methane of 33 ml/g, carbon dioxide of 225 ml/g and carbon monoxide of 273 ml/g, a tar yield was reduced to 5%, the tar proportion was further reduced, and the hydrogen proportion and yield were improved.
(5) Regeneration of catalyst for heat supply through combustion: in step (4), the carbon-aluminum composite material was used as the catalyst for 10 cycles, and then combustion gasification was performed to regenerate the catalyst, and obtained regenerated flue gas was used for heat supply of baking, gasification and reforming to realize energy self-sufficiency.

Comparative Example 1

(1) Pine sawdust with a moisture content lower than 10% was crushed to below 3 mm without baking pretreatment.
(2) Mixing between baked biomass and aluminum smelting waste residues: 40 g of aluminum smelting waste residues were taken and mixed with 5% organic acid of acetic acid by equal volume, stirred uniformly, and placed into a high-pressure reaction kettle. Deionized water was added, where a mass ratio of the water to the aluminum smelting waste residues was 3:1. A reaction was performed at 200° C. for 30 min, cooling was performed, and the sample was taken out, then was dehydrated and calcined at 550° C. for 2 h in a muffle furnace, and thermally activated. Due to good fluidity of the aluminum smelting waste residues, the aluminum smelting waste residues were mixed with the pine sawdust in step (1) well in a premixing reactor at 250° C. according to a mass ratio of 1:1, forming a plug flow moving bed layer, which was brought into a reaction furnace.

(3) Catalytic gasification of baked biomass by aluminum smelting waste residues: the mixture of the aluminum smelting waste residues and pine sawdust obtained in step (2) was heated to 700° C. in a pyrolysis furnace, a $CO_2/H_2O$ atmosphere with a volume ratio of 4/1 and a total flow rate of 0.2 L/min was introduced, and a pyrolysis reaction was performed for 30 min. Woody waste was catalyzed by the aluminum smelting waste residues for steam gasification to generate hydrogen of 275 ml/g, methane of 26 ml/g, carbon dioxide of 126 ml/g and carbon monoxide of 125 ml/g. At the same time, a liquid product was obtained with a yield of 25%. A carbon-aluminum composite material was obtained with a carbon yield of 16%.

Comparative Example 2

For Comparative Example 2, the following steps were continued on the basis of the steps (1), (2) and (3) of Comparative Example 1:

(4) Catalytic reforming of pyrolysis gas: the carbon-aluminum composite material obtained through the pyrolysis reaction of the step (3) of Comparative Example 1 was activated by steam and used as a fluidized bed catalyst in a second stage pyrolysis furnace. The primary pyrolysis gas (containing tar and pyrolysis gas) obtained in step (3) entered the second stage pyrolysis furnace for further catalytic cracking and reforming. Catalytic conversion was performed at 900° C., the carbon-aluminum composite material catalyzed the tar for cracking and reforming to obtain hydrogen of 486 ml/g, methane of 31 ml/g, carbon dioxide of 236 ml/g and carbon monoxide of 213 ml/g, and a tar yield was reduced to 10%.

Data comparison between Example 1 and Comparative Example 1, and Comparative Example 2 is shown as Table 1 below.

TABLE 1

| Adsorption material | Hydrogen yield/% | Hydrogen proportion/% | Combustible gas proportion/% | Tar yield/% |
|---|---|---|---|---|
| Example 1 | 679 | 56 | 81 | 5 |
| Comparative Example 1 | 275 | 49.8 | 77 | 22 |
| Comparative Example 2 | 586 | 50.3 | 75.6 | 10 |

It can be seen from the data in Table 1 that, compared with Comparative Example 1 and Comparative Example 2, in Example 1, the hydrogen yield, the hydrogen proportion and the combustible gas proportion are greatly improved, and the tar yield is reduced after the woody waste is subjected to baking pretreatment, catalytic gasification, and tar reforming.

Example 2

Example 2 is basically the same as Example 1, except that the baking pretreatment temperature is different, as shown in Table 2.

TABLE 2

| Pretreatment temperature | Hydrogen yield/% | Hydrogen proportion/% | Combustible gas proportion/% | Tar yield/% |
|---|---|---|---|---|
| 150° C. | 624 | 52.3 | 76.5 | 8 |
| 250° C. | 679 | 56 | 81 | 5 |
| 350° C. | 612 | 58 | 83 | 5 |

It can be seen from the data in Table 2 that, under the same process conditions, the baking pretreatment temperature of the woody waste has obvious influence on the hydrogen yield, the hydrogen proportion and the combustible gas proportion, and the tar yield. Compared with the baking temperature of 150° C., the baking temperature of 250° C. increases the hydrogen yield, the hydrogen proportion and the combustible gas proportion, and decreases the tar yield. When the baking pretreatment temperature of the woody waste reaches 350° C., the hydrogen yield is decreased greatly, although the hydrogen proportion, the combustible gas proportion and the tar yield do not change significantly.

Example 3

Example 2 is basically the same as Example 1, except that carrier gas components in step (3) is different, as shown in Table 3.

TABLE 3

| Carrier gas component | Hydrogen yield/% | Hydrogen proportion/% | Combustible gas proportion/% | Tar yield/% |
|---|---|---|---|---|
| $N_2$ | 286 | 45.6 | 70.6 | 15 |
| $N_2/H_2O$ | 628 | 53 | 73.5 | 10 |
| $CO_2/H_2O$ | 679 | 56 | 81 | 5 |

It can be seen from the data in Table 3 that under the same process conditions, the carrier gas components in the pyrolysis furnace have significant influence on the hydrogen yield, the hydrogen proportion, the combustible gas proportion, and the tar yield. When a $N_2$ atmosphere is introduced into the pyrolysis furnace during the pyrolysis reaction, the hydrogen yield, the hydrogen proportion and the combustible gas proportion are low, and the tar yield is high. When a $N_2/H_2O$ atmosphere is introduced into the pyrolysis furnace during the pyrolysis reaction, the hydrogen yield, the hydrogen proportion and the combustible gas proportion are greatly increased, and the tar yield is decreased compared with the $N_2$ atmosphere. When a $CO_2/H_2O$ atmosphere is introduced into the pyrolysis furnace during the pyrolysis reaction, the hydrogen yield, the hydrogen proportion and the combustible gas proportion are further improved, and the tar yield is further decreased compared with the $N_2/H_2O$ atmosphere.

According to the method of the present disclosure, a staged pyrolysis means of low-temperature baking treatment, medium-temperature catalytic gasification and high-temperature catalytic reforming is utilized to enable the sawdust to be catalytically gasified and the tar to be cracked and reformed, and to convert organic components into the hydrogen to the maximum extent, such that the hydrogen yield is improved by over 50%, the hydrogen proportion reaches over 55%, and the combustible gas proportion reaches over 80%.

In the process of synergistic treatment of the aluminum smelting waste residues and the pine sawdust, polluting components in the aluminum smelting waste residues are effectively suppressed, such that the hydrogen yield of the pine sawdust is improved, and the problem of waste resource caused by random stacking of woody waste and the problem of secondary pollution caused by landfill of aluminum smelting waste residues are solved. The carbon-aluminum composite material is further used as the catalyst of tar gasification reforming, such that a resource utilization rate of the aluminum smelting waste residues is improved, and the tar yield is reduced to below 5%.

According to the present disclosure, the molecular structure of the woody waste is improved through baking pretreatment, and the aluminum smelting waste residues and the baked biomass are fully mixed by a hot premixing method, such that the defects of a low density, a poor transportation property, a high oxygen content, etc. of the woody waste are fully overcome, the woody waste can be fully catalytically gasified, and the gasification efficiency is improved.

According to the present disclosure, through catalyst regeneration, the regenerated flue gas is used as a heat source to provide energy for baking, gasification and reforming, such that energy self-sufficiency is achieved, an energy recovery utilization rate reaches over 85%, balance between the hydrogen yield and energy consumption is realized, and the hydrogen production cost is reduced.

It should be noted that the above-mentioned examples are merely intended for description of the technical solutions of the present disclosure rather than limitation of the present disclosure. Although the present disclosure is described in detail with reference to the preferred examples, those of ordinary skill in the art should understand that they may still make modifications or equivalent replacements to the technical solutions of the present disclosure without departing from the spirit and scope of the technical solutions of the present disclosure, all of which should be encompassed within the scope of the claims of the present disclosure.

What is claimed is:

1. A method for producing hydrogen from woody waste through staged pyrolysis and catalytic gasification, comprising:

performing baking pretreatment on the woody waste at a baking temperature of 200-300° C. for baking time of 20-60 min;

thermally activating aluminum smelting waste residues, mixing the aluminum smelting waste residues with 5% organic acid by volume, placing a mixture in a high-pressure reaction kettle, adding deionized water for a reaction, performing cooling, then, performing dehydrating and calcining at a calcining temperature of 500-600° C. for calcining time of 1-2 h, and mixing the thermally activated aluminum smelting waste residues with the baked woody waste, wherein a mass volume ratio of the aluminum smelting waste residues to the organic acid is 1 g:1 mL, the organic acid comprises one or more of acetic acid and benzoic acid, the deionized water is added for the reaction, a mass ratio of the water to the aluminum smelting waste residues is 2-4:1, a temperature for the reaction is 200-300° C., and reaction time is 30-45 min;

pyrolyzing and gasifying the mixture for hydrogen production, and performing a pyrolysis reaction on the mixture at a temperature of 500-700° C. for 15-60 min to obtain primary pyrolysis gas and a carbon-aluminum composite material, wherein the pyrolysis reaction is performed under a $CO_2/H_2O$ atmosphere, a total flow rate of the introduced $CO_2/H_2O$ atmosphere is 0.1-0.2 L/min, and a volume ratio of $CO_2/H_2O$ is 1-4:1; and further catalytically cracking the obtained primary pyrolysis gas by taking the obtained carbon-aluminum composite material as a catalyst.

2. The method for producing hydrogen from woody waste through staged pyrolysis and catalytic gasification according to claim 1, wherein the mixing the thermally activated aluminum smelting waste residues with the baked woody waste is performed according to a mass ratio of 1:1 at 200-300° C.

3. The method for producing hydrogen from woody waste through staged pyrolysis and catalytic gasification according to claim 1, wherein the further catalytically cracking the obtained primary pyrolysis gas is performed at a temperature of 700-900° C.

* * * * *